US011769118B2

(12) United States Patent
Gillette et al.

(10) Patent No.: US 11,769,118 B2
(45) Date of Patent: Sep. 26, 2023

(54) SYSTEMS AND METHODS FOR AUTOMATED DIAGNOSTICS OF HVAC SYSTEMS

(71) Applicant: Johnson Controls Technology Company, Glendale, WI (US)

(72) Inventors: Theresa Thy N. Gillette, Wichita, KS (US); Jedidiah O. Bentz, Wichita, KS (US); Brian D. Rigg, Douglass, KS (US); Shawn A. Hern, Derby, KS (US); Tom R. Tasker, Andover, KS (US); Shaun B. Atchison, Wichita, KS (US); Tyler P. McCune, El Dorado, KS (US); Aneek M. Noor, Wichita, KS (US); John W. Uerkvitz, Valley Center, KS (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/586,533

(22) Filed: Jan. 27, 2022

(65) Prior Publication Data

US 2022/0147949 A1 May 12, 2022

Related U.S. Application Data

(63) Continuation of application No. 15/644,458, filed on Jul. 7, 2017, now abandoned.
(Continued)

(51) Int. Cl.
*G06Q 10/1093* (2023.01)
*F24D 19/10* (2006.01)
(Continued)

(52) U.S. Cl.
CPC ......... *G06Q 10/1095* (2013.01); *F24D 19/10* (2013.01); *F24F 11/38* (2018.01);
(Continued)

(58) Field of Classification Search
None
See application file for complete search history.

(56) References Cited

U.S. PATENT DOCUMENTS 8,437,878 B2  5/2013  Grohman
9,157,647 B2  10/2015  Leen
(Continued)

FOREIGN PATENT DOCUMENTS

CA    2957726 A1    3/2016
CA    3043996 A1    2/2018
(Continued)

OTHER PUBLICATIONS

Wang, Liping, et al. "Monitoring-based HVAC commissioning of an existing office building for energy efficiency." Applied energy 102 (2013): 1382-1390 (Year: 2013).*
(Continued)

*Primary Examiner* — Darlene Garcia-Guerra
(74) *Attorney, Agent, or Firm* — Fletcher Yoder, PC (57) ABSTRACT

A heating, ventilation, and air conditioning (HVAC) system includes a controller associated with a residence. The controller is configured to determine an expected value range for an operating parameter of a component of the HVAC system. Additionally, the controller is configured to receive a signal from a sensor indicative of a current value of the operating parameter of the component and determine if the current value of the operating parameter is outside the expected value range. Based on the determination that the current value is outside the expected value range, the controller is additionally configured to initiate a diagnostic
(Continued)

mode of the controller. In the diagnostic mode, the controller is configured to collect diagnostic data associated with the HVAC system.

24 Claims, 6 Drawing Sheets

Related U.S. Application Data (60) Provisional application No. 62/367,307, filed on Jul. 27, 2016.

(51) Int. Cl.

| | | |
|---|---|---|
| *H04L 67/10* | (2022.01) | |
| *G06Q 10/20* | (2023.01) | |
| *G05B 19/048* | (2006.01) | |
| *F24F 11/89* | (2018.01) | |
| *F24F 11/61* | (2018.01) | |
| *F24F 11/52* | (2018.01) | |
| *F24F 11/58* | (2018.01) | |
| *F24F 11/38* | (2018.01) | |
| *G05B 19/042* | (2006.01) | |
| *F24F 140/60* | (2018.01) | |
| *F24F 110/10* | (2018.01) | |
| *F24F 1/0003* | (2019.01) | |
| *F24F 110/30* | (2018.01) | |
| *F24F 110/40* | (2018.01) | |

(52) U.S. Cl.
CPC .............. *F24F 11/52* (2018.01); *F24F 11/58* (2018.01); *F24F 11/61* (2018.01); *F24F 11/89* (2018.01); *G05B 19/042* (2013.01); *G05B 19/048* (2013.01); *G06Q 10/20* (2013.01); *H04L 67/10* (2013.01); *F24F 1/0003* (2013.01); *F24F 2110/10* (2018.01); *F24F 2110/30* (2018.01); *F24F 2110/40* (2018.01); *F24F 2140/60* (2018.01); *G05B 2219/2614* (2013.01)

(56) References Cited

U.S. PATENT DOCUMENTS

| | | | |
|---|---|---|---|
| 9,188,508 B1* | 11/2015 | Meyer | G01M 99/005 |
| 9,447,985 B2 | 9/2016 | Johnson | |
| 9,454,893 B1* | 9/2016 | Warren | H04R 3/00 |
| 9,551,504 B2 | 1/2017 | Arensmeier et al. | |
| 9,995,502 B1* | 6/2018 | Reeder | G05B 15/02 |
| 10,281,166 B1 | 5/2019 | Hutz | |
| 10,753,630 B2* | 8/2020 | Rupp | F24F 11/38 |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2010/0102136 A1 | 4/2010 | Hadzidedic | |
| 2012/0022700 A1* | 1/2012 | Drees | H02J 13/00004 |
| | | | 705/412 |
| 2012/0221150 A1 | 8/2012 | Arensmeier | |
| 2013/0103622 A1 | 4/2013 | Matsuoka | |
| 2013/0158720 A1 | 6/2013 | Zywicki | |
| 2013/0158723 A1 | 6/2013 | Erickson | |
| 2013/0261808 A1 | 10/2013 | Besore | |
| 2013/0338839 A1 | 12/2013 | Rogers | |
| 2014/0032157 A1* | 1/2014 | Khiani | F24F 11/30 |
| | | | 702/122 |
| 2014/0074730 A1 | 3/2014 | Arensmeier | |
| 2014/0172400 A1 | 6/2014 | Majewski | |
| 2014/0262134 A1* | 9/2014 | Arensmeier | F24F 11/36 |
| | | | 165/11.2 |
| 2014/0343886 A1 | 11/2014 | Berinato | |
| 2015/0159899 A1 | 6/2015 | Bergman et al. | |
| 2015/0269641 A1* | 9/2015 | Roy | F24F 11/30 |
| | | | 705/26.4 |
| 2015/0323344 A1* | 11/2015 | Arlitt | G06Q 20/4016 |
| | | | 340/870.02 |
| 2015/0330650 A1 | 11/2015 | Abiprojo | |
| 2016/0209059 A1* | 7/2016 | Castillo | G06F 3/0484 |
| 2016/0215996 A1* | 7/2016 | Blair | F24F 11/58 |
| 2016/0334127 A1 | 11/2016 | Rupp et al. | |
| 2016/0370799 A1 | 12/2016 | Denton | |
| 2017/0011318 A1 | 1/2017 | Vigano et al. | |
| 2017/0051933 A1 | 2/2017 | Verhoeven | |
| 2017/0343228 A1* | 11/2017 | Dyess | F24F 11/49 |

FOREIGN PATENT DOCUMENTS

| | | |
|---|---|---|
| EP | 3 186 687 A4 | 7/2017 |
| EP | 3 497 377 A1 | 6/2019 |
| WO | 2016210091 | 12/2016 |

OTHER PUBLICATIONS

Namburu, Setu Madhavi, et al. "Data-driven modeling, fault diagnosis and optimal sensor selection for HVAC chillers." IEEE transactions on automation science and engineering 4.3 (2007): 469-473 (Year: 2007).*

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

(56) References Cited

OTHER PUBLICATIONS

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

\* cited by examiner

SYSTEMS AND METHODS FOR AUTOMATED DIAGNOSTICS OF HVAC SYSTEMS

CROSS REFERENCE TO RELATED APPLICATIONS

This application is a continuation of U.S. patent application Ser. No. 15/644,458, entitled "SYSTEMS AND METHODS FOR AUTOMATED DIAGNOSTICS OF HVAC SYSTEMS," filed Jul. 7, 2017, which claims priority from and the benefit of U.S. Provisional Patent Application No. 62/367,307, entitled "AUTOMATED DIAGNOSTICS," filed Jul. 27, 2016, which is hereby incorporated by reference.

BACKGROUND

The present disclosure relates generally to heating, ventilating, and air conditioning systems (HVAC), and more particularly to systems and methods for automated diagnostics of the HVAC systems.

A wide range of applications exist for HVAC systems. For example, residential, light commercial, commercial, and industrial systems are used to control temperatures and air quality in residences and buildings. Generally, HVAC systems may circulate a fluid, such as a refrigerant, through a closed loop between an evaporator where the fluid absorbs heat and a condenser where the fluid releases heat. The fluid flowing within the closed loop is generally formulated to undergo phase changes within the normal operating temperatures and pressures of the system so that quantities of heat can be exchanged by virtue of the latent heat of vaporization of the fluid.

As such, HVAC systems employ many components to provide heated, cooled, and/or dehumidified air to conditioned environments. To maintain proper operation of the components, HVAC systems may be inspected and repaired, especially during winter and summer seasons when the HVAC systems may be used more heavily. However, during normal operation, the HVAC systems may experience one or more issues that go unnoticed, thus, negatively affecting performance. Additionally, the reduced performance may eventually lead to increased repair or replacement of certain components of the HVAC systems. Accordingly, it may be desirable to provide diagnostic information about operation of the HVAC system more regularly and more reliably to increase efficiency of the HVAC system, as well as to identify issues before the issues progress.

SUMMARY

In one embodiment of the present disclosure, a heating, ventilation, and air conditioning (HVAC) system includes a controller associated with a residence. The controller is configured to determine an expected value range for an operating parameter of a component of the HVAC system. Additionally, the controller is configured to receive a signal from a sensor indicative of a current value of the operating parameter of the component and determine if the current value of the operating parameter is outside the expected value range. Moreover, based on the determination that the current value is outside the expected value range, the controller is configured to initiate a diagnostic mode of the controller. In the diagnostic mode, the controller is configured to collect diagnostic data associated with the HVAC system.

In another embodiment of the present disclosure, a method for performing a diagnostic mode for a controller associated with a residential heating, ventilation, and air conditioning (HVAC) system includes determining an expected value range for an operating parameter of a component of the HVAC system. The method also includes receiving a signal from a sensor indicative of a current value of the operating parameter of the component and determining if the current value of the operating parameter is outside the expected value range. Additionally, based on the determination that the current value is outside the expected value range, the method includes initiating a diagnostic mode of the controller. In the diagnostic mode, the method further includes collecting diagnostic data associated with the HVAC system.

In a further embodiment of the present disclosure, one or more non-transitory computer-readable storage medium storing processor-executable instructions, such that the instructions, when executed by a processor of a controller, cause the processor to determine an expected value range for an operating parameter of a component of a residential heating, ventilation, and air conditioning (HVAC) system. The instructions also cause the processor to receive a signal from a sensor indicative of a current value of the operating parameter of the component and determine if the current value of the operating parameter is outside the expected value range. Based on the determination that the current value is outside the expected value range, the instructions also cause the processor to initiate a diagnostic mode of the controller. In the diagnostic mode, the instructions further cause the processor to collect diagnostic data associated with the HVAC system.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to heating, ventilation, and air conditioning (HVAC) systems and systems and methods for performing diagnostics thereof. In general, HVAC systems include multiple components that are designed to condition an interior space. Conditioning requirements set for the HVAC system may be higher in certain seasons. For example, in summer, occupants of the interior space may request more cooling and/or dehumidification than during spring and/or fall seasons. Additionally, in winter, occupants of the interior space may request more heating and/or more humidification than during spring and/or fall. As such, the HVAC system may be inspected seasonally to increase efficiency and reliability with which components of the HVAC system will operate during the certain seasons. Moreover, as discussed above, components of the HVAC system may benefit from routine inspections at any time of the year to increase efficiency of the HVAC system and to identify possible deviations in operation before repair or replacement of the components is required.

To facilitate diagnostics of the components of the HVAC system, a controller may monitor various operating parameters of the HVAC system. For example, the operating parameters may include an indoor air pressure, plenum or duct air pressure, an outdoor air temperature, a return air temperature, electronic expansion valve (EEV) data, air flow rates, outdoor fan data, power usage data, or other parameters related to the HVAC system. The controller may store current values of the operating parameters in a database (e.g., electronic database, cloud database) for later access. Moreover, the controller may compare a current value of an operating parameter to an expected value for the operating parameter. For example, a control or a baseline reading may be taken for each HVAC component on a test bench. Then, based on a comparison of the current value to its respective expected value, the controller may determine whether the current value is outside an expected value range. If the expected value is outside the expected value range, the controller may proceed to initiate a diagnostic mode. As discussed in more detail below, the controller collects diagnostic data associated with the HVAC system while in the diagnostic mode. The controller may additionally transmit the diagnostic data to a service center, such that the service center is informed and able to identify and/or perform any proposed maintenance actions for the HVAC components.

Figure 1:
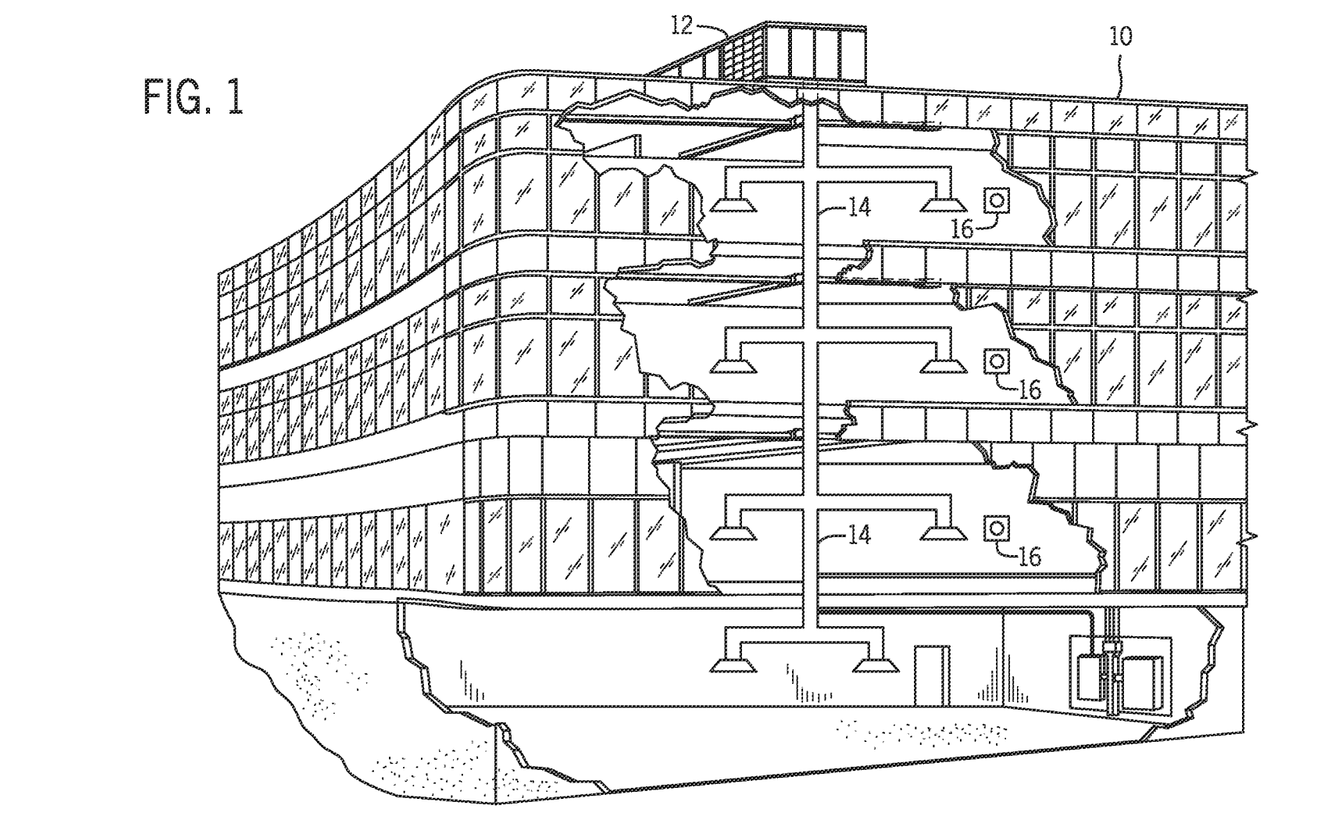
FIG. 1 is an illustration of an embodiment of a commercial or industrial HVAC system, in accordance with the present techniques.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
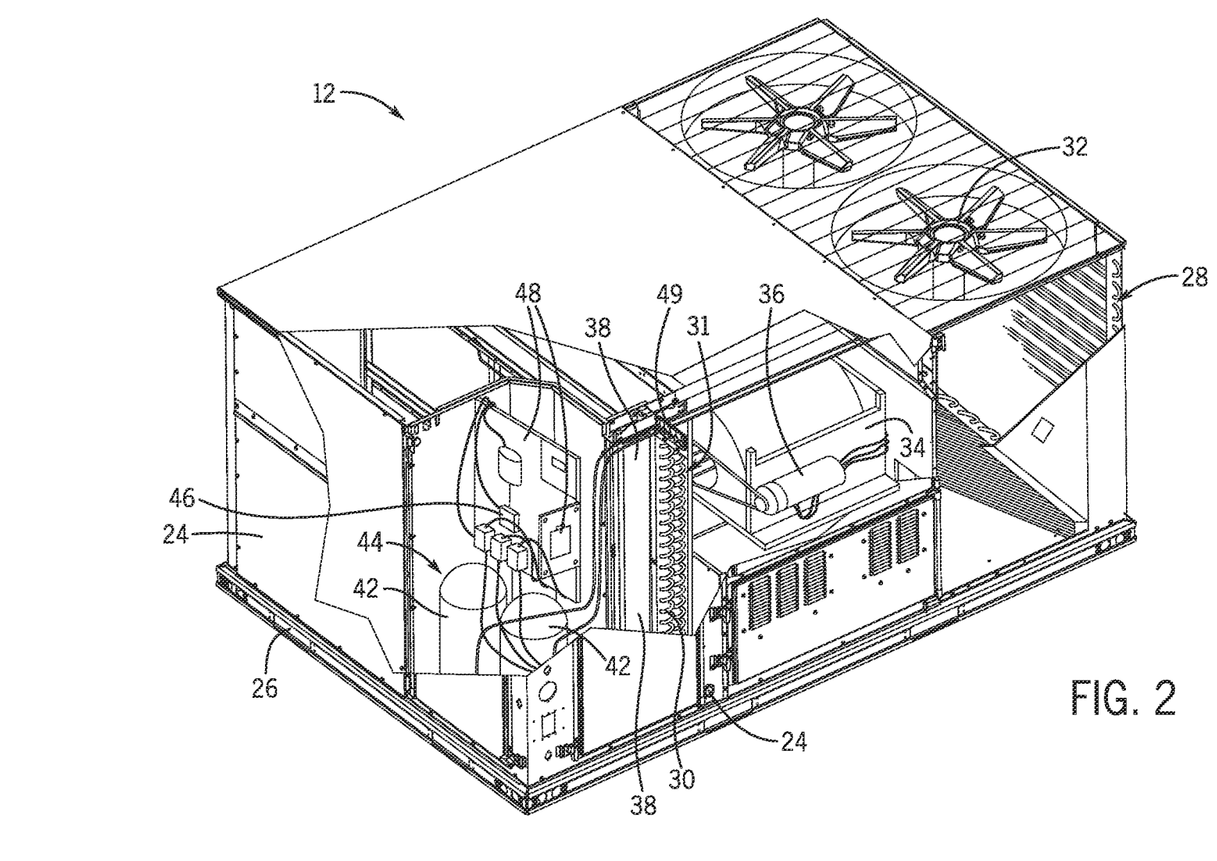
FIG. 2 is an illustration of an embodiment of a packaged unit of the HVAC system shown in FIG. 1, in accordance with the present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
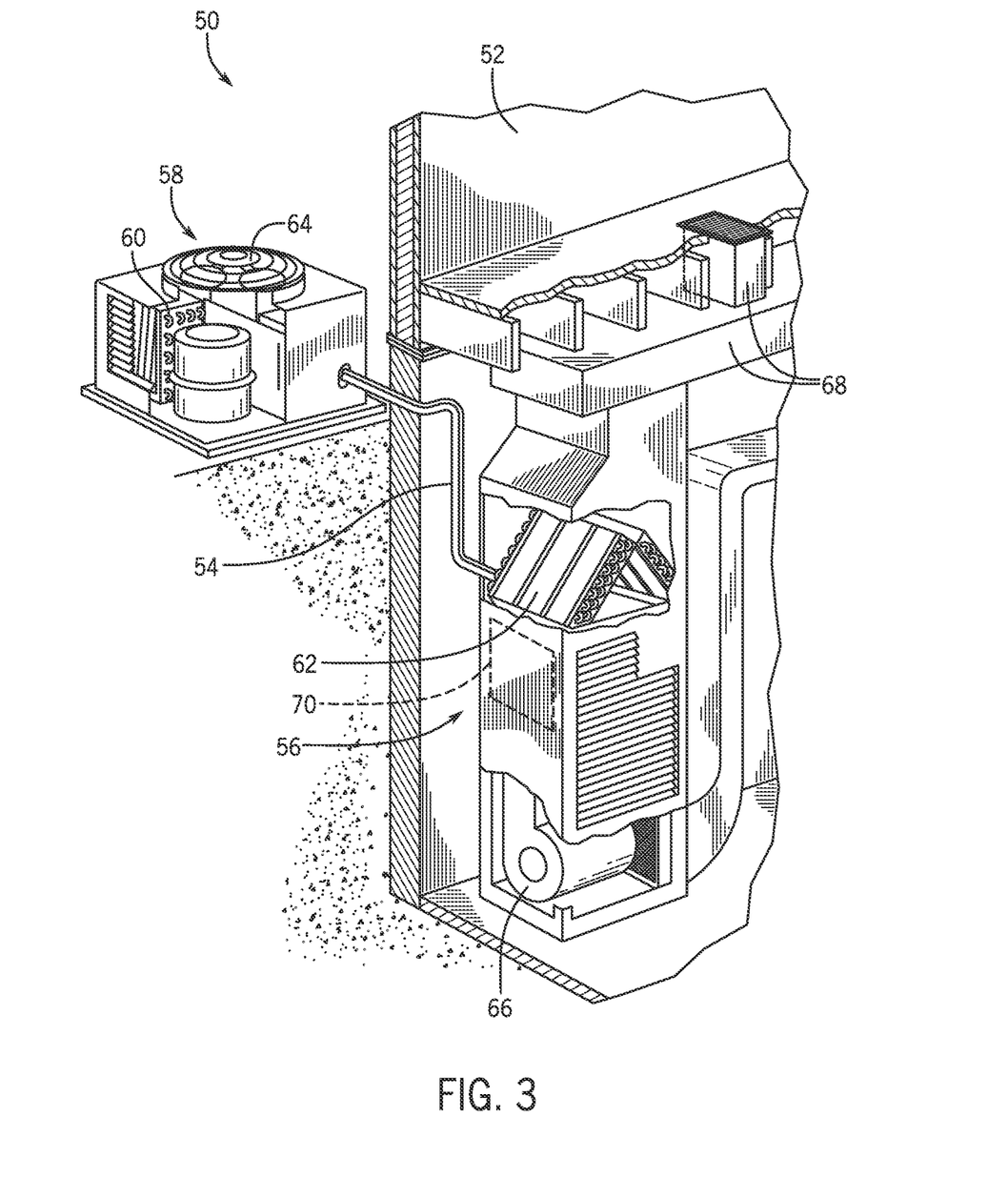
FIG. 3 is an illustration of an embodiment of a split system of the HVAC system shown in FIG. 1, in accordance with the present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
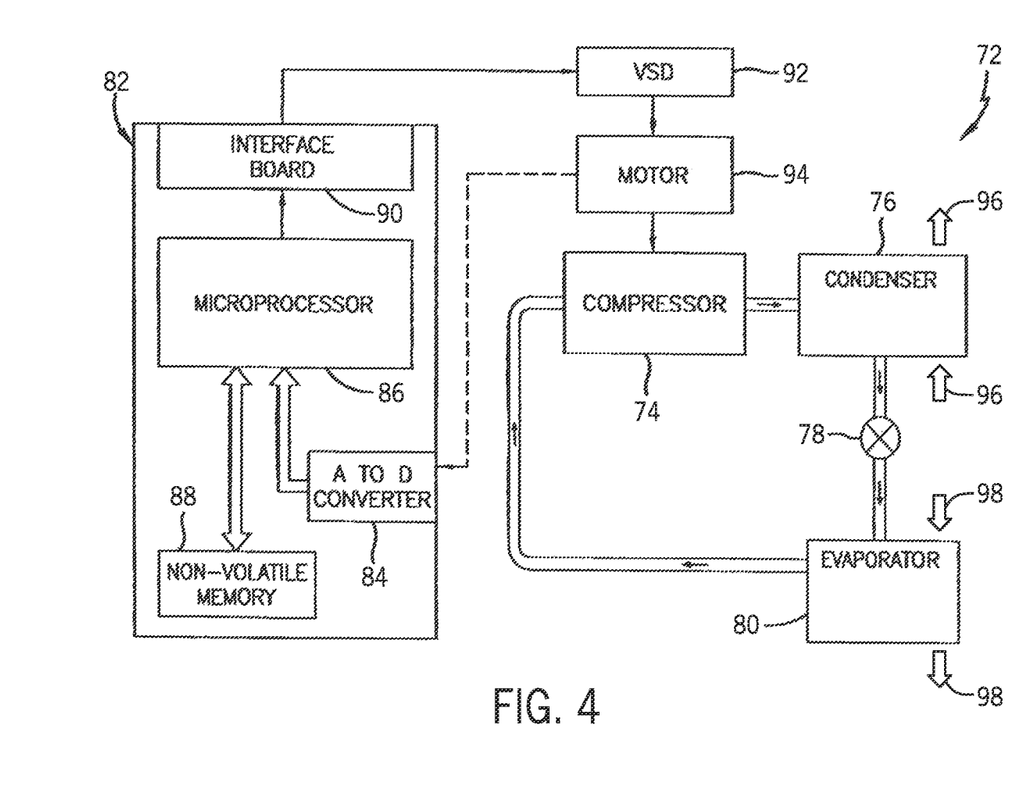
FIG. 4 is a schematic diagram of an embodiment of a refrigeration system of the HVAC system shown in FIG. 1, in accordance with the present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, the present techniques are directed to a control system for monitoring operating parameters and performing automated diagnostics for components of an HVAC system. For example, the control device 16 discussed above may be part of a control system that monitors current values of operating parameters of the components. The control device 16 may compare current values to respective expected value ranges for each operating parameter to determine if the current values are outside the respective expected value ranges. Then, the control device 16 may initiate a diagnostic mode if the control device 16 determines that one or more of the current values are outside the expected value ranges. In the diagnostic mode, the control device 16 may gather diagnostic data that is utilized to identify proposed maintenance actions for the components. Moreover, the control device 16 may communicate with computer systems that are integrated with or separate from other building control or monitoring systems, including systems that are remote from the building. For example, the control device 16 may transmit the diagnostic data and/or alerts to one or more service centers. The service center may include one or more user interfaces or controllers to enable determination of proposed maintenance actions for the components. Additionally, the service center may include technical service personnel that may perform the proposed maintenance actions for the one or more components. Further, the control device 16 may store the expected value ranges of the parameters and/or receive the expected value ranges in real time. In some embodiments, the service center determines the expected value ranges on a test bench and provides the expected value ranges to the control device 16 as a control or baseline. As such, the present techniques discussed in detail below enable an HVAC system to run more efficiently and more reliably than systems without control systems having the automated diagnostics features described herein.

Figure 5:
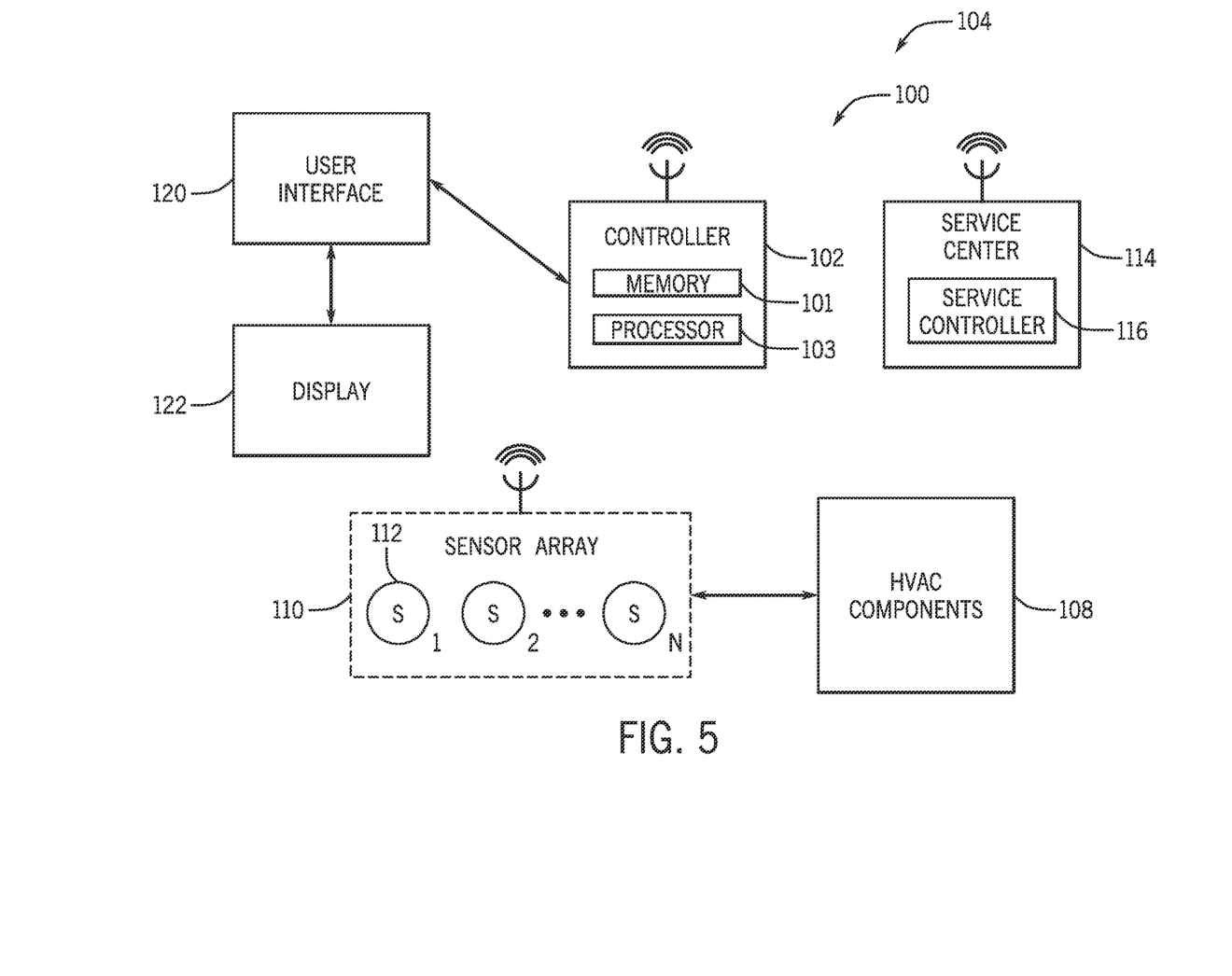
FIG. 5 is a schematic diagram of an embodiment of the HVAC system shown in FIG. 1 having a control system, in accordance with the present techniques.

FIG. 5 is a schematic illustrating a control system 100 having a controller 102 for monitoring components of an HVAC system 104. In some embodiments, the HVAC system 104 may encompass or include the HVAC unit 12 discussed above, the residential heating and cooling system 50 discussed above, and/or other HVAC systems. Moreover, the HVAC system 104 may perform all or a combination of heating, ventilation, and/or air conditioning functions. As shown, the HVAC system 104 includes HVAC components 108. The HVAC components 108 may be any of the above mentioned components of the HVAC unit 12, the residential heating and cooling system 50, or other components discussed above and/or below. As will be understood, the present techniques may include particular utility for residential systems, such that service centers associated with the HVAC system 104 are more quickly informed about deviations in performance of the HVAC components 108. As such, technical service personnel of the service center may be capable of arriving at a residence having the HVAC system 104 more quickly and with any desired tools or parts, such that maintenance actions may be completed more efficiently.

Moreover, in some embodiments, the controller 102 is, or may be a component of, the control device 16 or the interface board 90 discussed above. The controller 102 includes a memory 101 for storing data and instructions and a processor 103 for execution of the techniques disclosed herein. As shown, the controller 102 communicates with many elements of the control system 100 to monitor the HVAC components 108. For example, the controller 102 transmits and/or receives signals from a sensor array 110, a service center 114, and a user interface 120. By communicating with and controlling the HVAC system 104, the control system 100 facilitates automated diagnostics thereof. As shown, the controller 102 may wirelessly communicate to the other components of the control system 100 through wireless connections, such as a connection through a cellular network, radio transmission, Bluetooth® Low Energy, ZigBee®, WiFi®, or another time of wireless communication. Moreover, in some embodiments, the controller 102 and the other components may communicate and transmit data through wired connections.

As shown, the controller 102 receives transmits and/or receives signals from a sensor array 110. The sensor array 110 may include one sensor 112 or multiple sensors 112. In some embodiments, the sensors 112 of the sensor array 110 are disposed on or near the HVAC components 108. In some embodiments, the sensors 112 are positioned near inlet regions and/or outlet regions of the HVAC components 108. As such, the sensors 112 may transmit signals to the controller 102 that are indicative of operating parameters of the HVAC components 108. The sensors 112 may transmit the signals indicative of the operating parameters at regular intervals to the controller 102, upon instruction by the controller 102, and/or when the operating parameters related to a respective component of the HVAC components 108 has changed. The sensors 112 may be any suitable type of sensor for monitoring the operating parameters of the HVAC components 108, including pressure sensors, temperature sensors, flow sensors, EEV sensors, voltage sensors, vibration sensors, stress sensors, among others.

By way of an example, sensors 112 may be disposed near the heat exchanger 62 (FIG. 3) to monitor a flow of refrigerant therein. The sensors 112 may thus transmit signals to the controller 102 indicative of the flow of refrigerant in the heat exchanger 62. The sensors 112 may transmit the signals each time a predefined period of time (e.g., 1 second, 30 seconds, 5 minutes, 60 minutes, etc.) has passed. Additionally or alternatively, the sensors 112 may transmit the signals based on a request from the controller 102. That is, upon instruction from the controller 102, the sensors 112 may transmit signals indicative of the flow of refrigerant in the heat exchanger 62. Moreover, the sensors 112 may transmit a signal when the flow of refrigerant changes (e.g., beyond a change threshold). For example, the sensors 112 may transmit a signal indicative of an initial flow of the refrigerant when the control system 100 is first turned on. Then, the sensors 112 may not transmit signals for as long as the flow of refrigerant is substantially the same as (e.g., within a range from, within a percentage difference from) the initial flow of the refrigerant. When the flow of refrigerant changes, the sensors 112 may then transmit a signal indicative of a current flow of the refrigerant. By receiving the signals from the sensors 112 in real time, the controller 102 may thus determine the flow of the refrigerant in the heat exchanger 62 or be able to accurately estimate (e.g., interpolate, extrapolate) the flow during all operation of the HVAC system 104.

It is to be understood that the operation of the sensors 112 may be extended to all HVAC components 108 and all operating parameters thereof. That is, in some embodiments, the sensors 112 transmit signals indicative of operating parameters that include pressures, temperatures, leaving air temperature, EEV data, airflows, outdoor fan data, incoming power data, and the like. In some embodiments, the operating parameters include each parameter of the residential heating and cooling system 50 that the controller 102 is able to monitor. Moreover, the sensors 112 may each include wireless or wired connections to the controller 102. In some embodiments, application of the present techniques includes adding new sensors 112 to a preexisting sensor array 110 and/or adding communication functions to existing sensors 112.

Moreover, the sensors 112 may transmit signals indicative of status indicators for certain HVAC components 108. In such embodiments, status indicators are to be understood to be another type of operating parameter. For example, the status indicators may indicate whether the HVAC components 108 have a healthy status, a fault status, an online status, and/or an offline status. In some embodiments, the controller 102 receives signals from sensors 112 indicative of the status indicators for each HVAC component 108. For example, one of the sensors 112 may indicate that the furnace system 70 is offline. Then, when the residential heating and cooling system 50 starts the furnace system 70, the sensor 112 may indicate that the furnace system 70 has an online status and a healthy status. In certain embodiments, if instead of turning on, the furnace system 70 misfires, the controller 102 may identify that the status indicator for the furnace system 70 includes a fault status and/or an offline status. In such embodiments, the controller 102 may monitor the status indicators to determine whether components are healthy or in need of maintenance.

To enable automated diagnostics, the sensors 112 transmit the current values of operating parameters, such as operating data, current operating data, and/or status indicators, to the controller 102. By receiving the current values of the operating parameters, the controller 102 may monitor the operation of the HVAC components 108. Additionally, the controller 102 may store the current values of the operating parameters as stored values of the operating parameters in a memory, a database, a cloud database, a hard drive, or in another suitable electronic or physical form. The controller 102 may therefore operate as a historian component of the control system 100. Moreover, in some embodiments, the controller 102 is able to access, view, and utilize the stored operating parameters for performing automated diagnostics. The controller 102 may also enable operators to view organized views of the stored operating parameters, such as timelines of the operating data organized by component, environmental conditions, and/or detected errors, among others.

Moreover, the controller 102 communicates with the service center 114. The controller 102 may receive signals from and transmit signals to the service center 114 to enable automated diagnostics of the HVAC components 108. The service center 114 may house technical service personnel who specialized in performing maintenance actions for the HVAC components 108. For example, the service center 114 may communicate with multiple controllers 102 of multiple HVAC systems 104. In some embodiments, the service center 114 communicates with each controller 102 in a geographical region (e.g., town, county, state, etc.) and/or each controller 102 associated with certain types of equipment (e.g., model of residential HVAC systems, HVAC systems having a furnace system, HVAC systems having a heat pump, etc.). In some embodiments, the HVAC system 104 and/or the controller 102 may have been installed in the residence 52 (FIG. 3) by the technical service personnel of the service center 114. As such, the service center 114 may include specialized diagnostic equipment, a service controller 116, and replacement parts for the HVAC components 108 to enable performance of maintenance actions.

Further, the service center 114 may determine baseline data for the HVAC components 108 during a baseline test. That is, the service center 114 may perform a baseline test to monitor test components that correspond to the HVAC components 108. For example, in some embodiments, the test components correspond to the HVAC components 108 by having the same or similar product models as the HVAC components 108, the same or similar operating characteristics as the HVAC components, and the like.

In some embodiments, the service center 114 monitors the test components through baseline tests performed over various testing operating conditions. The various testing operating conditions may include ranges and subsets of operating conditions that the HVAC components 108 of the HVAC system 104 may experience. In some embodiments, the testing operating conditions may include all, or a substantial (e.g., major) portion, of the operating conditions that the HVAC components 108 may experience. In some embodiments, the service center 114 may include sensors enabled to transmit data to the service controller 116 that is indicative of the performance of the test components in the various testing operating conditions. Thus, the service controller 116 of the service center 114 may collect values of parameters indicative of the operation of the test components throughout the testing operating conditions. Moreover, the service controller 116 may extrapolate, interpolate, or otherwise determine parameters indicative of operation of the test components through an extended range of operating conditions based on the collected values of testing operating parameters.

For example, the test components may include a test blower similar or identical to the blower 66 (FIG. 3). In some embodiments, performance of the test blower is monitored over all or a portion of the temperatures, pressures, and flowrates that the test blower may experience or generate. In some embodiments, one operating parameter is varied during the baseline test of the test blower at a time, such that various relationships are determined for how each operating parameter relates to one another. For example, the baseline test may be performed by holding all other variables constant while the temperature is varied, while changes in the performance of the test blower are closely monitored to determine the effect of changing temperature on the other variables. The baseline test process may be repeated for each variable or set of variables that are independent from a remaining portion of the variables. Additionally, the baseline test may be repeated for each major process (e.g. compression, evaporation, condensation etc.) of the HVAC system 104 or each component therein.

As a result, the service center 114 collects baseline data for the test components that may be used to determine an expected value range for the operating parameters of the HVAC components 108. The expected value range may be determined individually for each HVAC component 108 or for each parameter of the HVAC components 108. For example, the service center 114 may determine via a baseline test that during certain environmental conditions, the power usage of the fan 64 (FIG. 3) normally ranges between 400 and 500 Watts. As such, the service center 114 may set an expected value range for an operating parameter for power usage of the fan 64 based on the baseline data produced by the baseline test. The expected value range may be set as the baseline data, as a predefined value difference from the baseline data, as a percentage difference from the baseline data, or as another suitable relationship relative to the baseline data. For example, the service center 114 may determine that power usages of the fan 64 within 10% of the normal range of 400 to 500 Watts observed during the baseline test are within a respective expected value range.

In some embodiments, the service center 114 may individually determine the expected value range for each operating parameter and/or for component. For example, the expected value range for power usage of the fan 64 may be broader than an expected value range for temperature of refrigerant in the heat exchanger 62 (FIG. 3). In such embodiments, the expected value range for the power usage may be embodied by a ten percent difference from respective baseline data, while the expected value range for the temperature of the refrigerant may be embodied by a five percent difference from respective data. It is to be understood, however, that any suitable expected value range may be set for each operating parameter of the HVAC system 104. Indeed, some expected value ranges may be defined by a percentage difference or deviation above the respective baseline data, while other expected value ranges are defined by a percentage difference or deviation below the respective baseline data.

As such, the baseline data collected from the test components may be used to determine the expected value ranges used to quantify how the HVAC components 108 of the residence 52 are operating. In some embodiments, the expected value ranges for each parameter of each HVAC component 108 is transmitted from the service center 114 to the controller 102. However, the expected value ranges may be installed in the controller 102 by the technical service personnel of the service center 114, or the service center 114 may transmit the baseline data to the controller 102, which may locally determine the expected value ranges from the baseline data. In some embodiments, the baseline data is continuously updated to include new test components correlating to new HVAC components 108, such that the baseline data covers all known components of the HVAC system 104. However, the service center 114 and/or the controller 102 may also extrapolate, interpolate, or otherwise suitably determine an expected value range for components that do not include actual baseline data. For example, if baseline data is available for a component that is similar to an HVAC component 108 of the HVAC system 104, the service center 114, or the controller 102 may duplicate and utilize the data as baseline data for the actual HVAC component 108. In such embodiments, a degree of certainty may be accounted for the duplicated baseline data by the expected value range determined therefrom, such that the expected value range includes a larger range or larger margin of error for the duplicated data.

In certain embodiments, the controller 102 automatically monitors operation of the HVAC components 108 by comparing the current values of operating parameters to respective expected value ranges for the operating parameters. In some embodiments, the controller 102 may compare each current value as it is received to the expected value ranges. Then, the controller 102 determines if the current value is inside or outside of the expected value range. If the parameter is inside the range, the controller 102 may proceed to continue monitoring the HVAC components 108.

Based on a determination that one or more current values are outside respective expected value ranges, the controller 102 may initiate a diagnostic mode. The diagnostic mode may be initiated or triggered based on a determination that a certain number of current values of parameters are outside the respective expected value range. In addition, the controller 102 may be enabled to perform different types of diagnostic modes based on which components or what quantity of components have current values of operating parameters outside the respective expected value ranges. As such, based on the automatic receipt of the current values and determination of whether the current values are outside respective expected value ranges, the controller 102 automatically initiates the diagnostic mode to collect diagnostic data for identifying proposed maintenance actions.

In the diagnostic mode, the controller 102 may collect certain diagnostic data and transmit the diagnostic data to the service center 114. The diagnostic data may include a comprehensive series of data points, such as pressures, outdoor air temperature, return or supply air temperature, EEV data, air flow rates, outdoor fan data, incoming power data, and/or any other data collectable by the control system 100. The diagnostic data from the controller 102 may then be transmitted to the service center 114 or uploaded to a cloud for the service center 114 to view. Additionally, in some embodiments, the controller 102 may send the diagnostic data to the service center 114 when a certain time period of diagnostic data or amount of diagnostic data (e.g., 5 minutes, 1 hour, 10 sample points, 20 sample points, 100 sample points, etc.) is collected. In some embodiments, the controller 102 transmits the diagnostic data as soon as a data point is collected for each HVAC component 108 or a desired subset of the HVAC components 108. Moreover, the diagnostic data may be transmitted as soon as the diagnostic mode is determined to be complete. Upon completion of collecting the diagnostic data, the controller 102 may turn off the diagnostic mode. Additionally, if a portion of the diagnostic data is not able to be collected, the controller 102 may terminate the diagnostic mode and store an indication of which diagnostic data was not able to be collected.

In some embodiments, the controller 102 may initiate various types of diagnostic modes based on the quantity and/or type of HVAC components 108 that have deviated from the respective expected value baselines. For example, the controller 102 may initiate an extreme diagnostic mode if at least a threshold quantity of the HVAC components 108 has deviated from the respective expected value baselines. Additionally or alternatively, the controller 102 may initiate the extreme diagnostic mode if certain HVAC components (e.g., blower 66, furnace system 70, and heat exchangers 60, 62, etc.) of the HVAC components 108 have deviated from the respective expected value baselines. In the extreme diagnostic mode, the controller 102 may collect diagnostic data at a greater resolution/frequency and/or for a longer period of time than in a standard diagnostic mode. Moreover, the controller 102 may additionally or alternatively be configured to send an alert to the service center 114 indicative of the initiation of the extreme diagnostic mode, such that the service center 114 may be immediately or near immediately informed of any potential issues to enable rapid identification of proposed maintenance actions.

Additionally, the controller 102 may initiate a lesser diagnostic mode if only one HVAC component 108 has deviated from the respective expected value baseline and/or if only certain HVAC components 108 (e.g., ductwork 68, refrigerant conduits 54) of the HVAC components 108 have deviated from the expected value baselines. In some embodiments, the lesser diagnostic mode collects diagnostic data at a lower resolution/frequency and/or for a lesser period of time than in the standard diagnostic mode. Moreover, in some embodiments of the lesser diagnostic mode, the controller 102 may store diagnostic data collected therefrom instead of transmitting the diagnostic data to the service center 114. In such embodiments, the diagnostic data may still be available for viewing or analysis upon request. As such, the controller 102 may be enabled to maintain memory and processing ability for performing subsequent standard and/or extreme diagnostic modes. It is to be understood that the various types of diagnostic modes may be configured based on characteristics of the HVAC system 104 (e.g., memory, processing power, components, and associated service center 114) and/or the user of the HVAC system 104.

Thus, based on the diagnostic data associated with the HVAC system 104, the service center 114 is enabled to identify proposed maintenance actions. For example, based on the diagnostic data, the service center 114 may analyze, diagnose, and repair any potential faults detected by the controller 102. To enable the service center 114 to better access the diagnostic data, the diagnostic data may be categorized based on various properties associated with the HVAC system 104. For example, the diagnostic data may be categorized within a database based on the type or qualities of the residence 52, the location of the residence 52, the types of components included in the HVAC system 104, environmental qualities (temperature, pressure, precipitation, salt content, humidity, elevation, etc.) associated with the location of the residence, identification data related to the controller 102, identification data or qualifications related to technical service personnel of the service center 114 associated with the controller 102, or the like. Thus, the service controller 116 or the personnel of the service center 114 may be able to access the diagnostic data and corresponding issues that have occurred in similar residences or HVAC system 104 to quickly and accurately identify proposed maintenance actions for the HVAC system 104.

In some embodiments, the service center 114 may initiate a diagnostic mode on the HVAC system 104. For example, if similar HVAC systems 104 in the same environment as the HVAC system 104 are experiencing parameters outside of expected value ranges, the service center 114 may request that the controller 102 enters a diagnostic mode. That is, if a predetermined quantity of other HVAC systems 104 within a predefined distance of the HVAC system 104 have initiated diagnostic modes, the service center 114 may instruct the controller 102 to perform a diagnostic mode. Thus, the service center 114 may inform the user of the HVAC system 104 to modify operation of the HVAC system 104 to preemptively keep the system running smoothly.

In some embodiments, the diagnostic data is taken at an increased rate relative to the operating data. Additionally or alternatively, the diagnostic data may be sampled for more operating parameters than the operating data. That is, the diagnostic data may include more information about operation of the HVAC system 104 than the operating data, such that a higher resolution and/or greater depth of information are collected in the diagnostic data. Additionally, the HVAC system 104 may automatically initiate and complete a diagnostic mode a predefined quantity of times per year. Moreover, the HVAC system 104 may perform the diagnostic mode at least once before each summer season and at least one before each winter season to ensure operation of the HVAC system 104 is checked before heavy heating and cooling seasons (e.g., high-HVAC-stress seasons) begin. In some embodiments, the HVAC system 104 may perform the diagnostic mode a predefined quantity of time after the last diagnostic mode was complete, such that current diagnostic data is regularly available for the HVAC system 104. Each of these quantities of time may be user set or set by the service center 114. Additionally, the diagnostic data is uploaded and stored in the controller 102 and/or the service center 114 such that the data may be readily reviewed. As such, the techniques disclosed herein enable multiple residences to be checked for proper operation before winter and/or summer seasons begin, thus reducing a workload of repair requests made to the service center 114.

The diagnostic data may additionally include a list of any previous or current status indicators of the operating data of the HVAC system 104. For each fault status, the controller 102 or the service center 114 may identify which HVAC components 108 or groups of HVAC components 108 (e.g., hierarchal arrangement) contributed to the fault status. Additionally, such calculations may include a determination of a degree of certainty that the HVAC components 108 are responsible for the fault status. Moreover, the service center 114 may analyze the list of status indicators in the service center 114 along with the other operating data to predict any future deviations from the expected value range. The predicted deviations may include a prediction of how likely it is that the deviation will occur. In some embodiments, one or all of such determinations are made from the diagnostic data. Additionally, the predicted deviations may include values of operating parameters that are beyond the respective expected value thresholds, status indicators that indicate a fault status or indicate an offline status when an online status was requested, or other suitable predictions made from the data acquired herein. In some embodiments, the status indicators respectively indicate whether each HVAC component includes a healthy status or a fault status, such that the healthy status is indicated by respective current values within the expected value range, and the fault status is indicated by respective current values outside of the expected value range.

In some embodiments, the service center 114 analyzes the diagnostic data to determine whether any HVAC components 108 are in need repair or replacement. Thus, the service center 114 can coordinate with the user of the HVAC system 104 to schedule proposed maintenance actions to perform the repair or replacement. Additionally, the technical service personnel may arrive at the residence 52 having the HVAC system 104 with any desired tools or parts. As such, the automatic diagnostics procedure reduces operator trips and increases knowledge available to both the service center and the user of the HVAC system 104.

Moreover, the controller 102 may be communicatively coupled to a user interface 120. The user interface 120 may include a display 122 to display information to a user of the controller 102. In certain embodiments, the display 122 and the user interface 120 are within the residence 52 and/or integral with the controller 102, though in other embodiments, the user interface 120 and the display 122 may be part of a mobile device, laptop, tablet, smart TV, or the like. As will be discussed in more detail below, the user interface 120 may receive instruction from the controller 102 and/or the service center 114 to display certain information or alerts to the user. Additionally, the user interface 120 may also receive input from the user to send instructions and/or alerts to the controller 102 and/or service center 114.

In some embodiments, via the user interface 120, the user of the HVAC system 104 may set user settings to indicate how the service center 114 may interact with the HVAC system 104. Via the user settings, the user may select how the controller 102 will communicate with the service center 114. For example, the user may select what times of the day, the week and/or the month the controller 102 will communicate with the service center 114. Additionally, the user may select other user settings, such as a preferred service center, a preferred time of the day, the week, and/or the month that proposed maintenance actions are performed. The user may additionally select whether the technical service personnel have permission to work on an exterior of the residence 52 and/or inside the residence 52 when the user is not home.

In some embodiments, the user interface 120 may communicate certain actions or requests to the user. For example, the display 122 of the user interface 120 may present recommended actions or behaviors to the user based on the operating data and/or the diagnostic data collected during diagnostic modes. For example, if a fault status is determined, the recommended actions or behaviors may be designed to guard the faulted HVAC components 108 from further damage. Such recommended actions or behaviors may include requesting that the user to change the temperature and/or humidity settings of the residence until technical service personnel arrive to perform proposed maintenance actions. In some embodiments, the user interface 120 may prompt the user to complete a questionnaire to describe physical characteristics of the HVAC components 108. For example, the user may describe an appearance of the HVAC components 108, sounds made by the HVAC components 108, or other suitably physical descriptions that typical sensors 112 of the HVAC system 104 may not be able to collect. Moreover, through the user interface 120, the user may be able to initiate one or more diagnostic modes (e.g., user-initiated diagnostic mode). Upon initiation of a user-initiated diagnostic mode, a specialized questionnaire may be presented to the user to describe what issues may be occurring the HVAC system 104, thus enabling the controller 102 and/or the service center 114 to more rapidly identify any proposed maintenance actions that are targeted toward the issues of the HVAC system 104.

Figure 6:
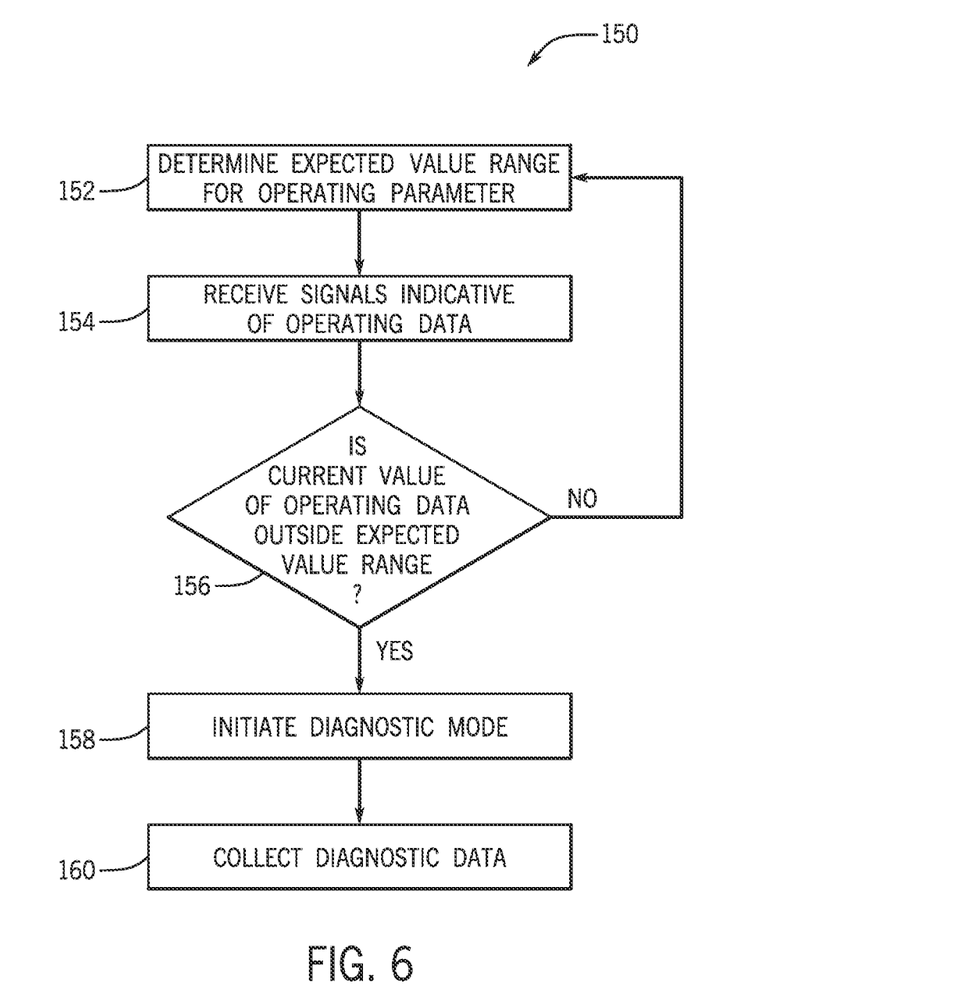
FIG. 6 is a flowchart of a method for performing diagnostics with the control system shown in FIG. 5, in accordance with the present techniques.

FIG. 6 illustrates a flowchart of a method 150 that may be employed to perform the diagnostic mode of the controller 102 of FIG. 5. It is to be understood that the steps discussed herein are merely exemplary, and certain steps may be combined, omitted, or performed in a different order than the order discussed herein. Moreover, although discussed with reference to the controller 102 (FIG. 5), it is to be understood that the steps may be performed by other suitable devices, such as the controller 116 of the service center 114, a remote device, or the like. First, the method 150 may include determining an expected value range for each operating parameter of the HVAC components 108 of the HVAC system 104 (block 152). For example, the expected value range may be determined based on baseline data that is collected during a baseline test, such as may be conducted at the service center 114. The baseline test may monitor the operating parameters for one or more HVAC components similar or the same as the HVAC components 108. Thus, based on the observed baseline data, expected value ranges may be determined by the service center 114 and provided to the controller 102 of the HVAC system 104.

Next, the method 150 includes receiving signals indicative of operating data of the HVAC components 108 (block 154). That is, the controller 102 may locally monitor the operating parameters of the HVAC components 108. The controller 102 may determine one or more current values for the operating parameters based on signals transmitted from sensors 112.

Additionally, the method 150 includes determining (node 156) if a current value of an operating parameter is outside the expected value range. If the expected value is inside the expected value range, the controller 102 may then continue to receive and monitor operating data. Moreover, the determination may be repeated for each operating parameter of each component. However, the determination may be based solely on one current value being outside the expected value range.

If the controller determines (node 156) that the operating parameter is outside the expected range, the controller 102 may proceed to initiate the diagnostic mode (block 158). In such embodiments, the method 150 may also include collecting diagnostic data (block 160). As previously discussed, the controller 102 may collect the diagnostic data at a greater frequency and/or for a greater amount of time than the frequency and/or amount of time operational data is collected. Moreover, the diagnostic mode may be initiated based on other determinations, such as user input, passed amounts of time, or other suitable considerations discussed above. Moreover, the diagnostic mode may be customized for each individual HVAC system 104 and/or service center 114.

Accordingly, the present disclosure is directed to a control system of a HVAC system that monitors operation of the HVAC components to selectively initiate a diagnostic mode. The diagnostic mode is initiated based on a determination that at least one current value of an operating parameter is outside an expected value range. Indeed, as discussed above, the expected value range may be determined by a service center based on baseline tests performed on components similar to the HVAC components. In the diagnostic mode, the controller may automatically collect and transmit diagnostic data to the service center, such that proposed maintenance actions may be determined and performed for the HVAC system more efficiently compared to systems without automated diagnostics.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed features). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and air conditioning (HVAC) system, comprising:
    a controller configured to:
        determine, via a processor of the controller, an expected value range for an operating parameter of a component of the HVAC system;
        receive, via a communication component of the controller, a signal from a sensor indicative of a current value of the operating parameter of the component at a first frequency;
        determine, via the processor, that the current value of the operating parameter is outside the expected value range;
        based on the determination that the current value is outside the expected value range, automatically initiate, via the processor, a first diagnostic mode of the controller, wherein in the first diagnostic mode, the controller is configured to collect diagnostic data associated with the HVAC system at a second frequency;
        determine, via the processor, an additional expected value range for an additional operating parameter of an additional component of the HVAC system;
        receive, via the communication component, an additional signal from an additional sensor indicative of an additional current value of the additional operating parameter of the additional component;
        determine, via the processor, that the additional current value of the additional operating parameter is outside the additional expected value range; and
        based on the determination that the additional current value is outside the additional expected value range, automatically initiate, via the processor, a second diagnostic mode of the controller, wherein the controller is configured to collect additional diagnostic data associated with the HVAC system at a third frequency, and wherein the second diagnostic mode differs from the first diagnostic mode at least in that the third frequency is greater than the second frequency.

2. The HVAC system of claim 1, wherein the controller is configured to transmit, via the communication component, the diagnostic data or the additional diagnostic data to a service center for analysis to identify proposed maintenance actions for the component or the additional component.

3. The HVAC system of claim 1, wherein the controller is configured to transmit, via the communication component, the diagnostic data or the additional diagnostic data to a cloud database for access by a service center.

4. The HVAC system of claim 1, wherein the expected value range and the additional expected value range are determined based on baseline data collected from a baseline test, wherein the baseline test includes monitoring operation of one or more test components similar to the component or the additional component.

5. The HVAC system of claim 1, wherein the additional component comprises a residential indoor unit, a residential outdoor unit, a residential heat exchanger, a residential fan, a residential blower, a residential furnace system, or a combination thereof, and wherein the component comprises a residential refrigerant conduit, a residential section of ductwork, or a combination thereof.

6. The HVAC system of claim 1, wherein the additional operating parameter comprises an operating pressure, an operating temperature, an operating leaving air temperature, operating electronic expansion valve (EEV) data, operating air flow rate, operating outdoor fan data, operating power usage data, or a combination thereof.

7. The HVAC system of claim 1, wherein the operating parameter comprises a status indicator of the component, wherein the status indicator comprises an indication that the component comprises a healthy status or a fault status, wherein the healthy status is indicated by the current value within the expected value range, and wherein the fault status is indicated by the current value outside of the expected value range.

8. The HVAC system of claim 1, wherein the second frequency and the third frequency are greater than the first frequency.

9. The HVAC system of claim 1, wherein the controller is configured to:
   determine, via the processor, that the first diagnostic mode or the second diagnostic mode has not been initiated during a certain time period; and
   based on the determination that the first diagnostic mode or the second diagnostic mode has not been initiated during the certain time period, initiate, via the processor, the first diagnostic mode or the second diagnostic mode of the controller.

10. The HVAC system of claim 9, wherein the certain time period is a period of time before a high-use season of the HVAC system.

11. The HVAC system of claim 1, wherein the controller is configured to:
   determine, via the processor, that the first diagnostic mode or the second diagnostic mode has not been initiated within an elapsed time threshold; and
   based on the determination that the first diagnostic mode or the second diagnostic mode has not been initiated within the elapsed time threshold, initiate, via the processor, the first diagnostic mode or the second diagnostic mode of the controller.

12. The HVAC system of claim 1, comprising a user interface communicatively coupled to the controller, and wherein the controller is configured to:
   determine, via the processor, that user input indicative of a request to initiate the first diagnostic mode or the second diagnostic mode has been received; and
   based on the determination that the user input indicative of the request to initiate the first diagnostic mode or the second diagnostic mode has been received, initiate the first diagnostic mode or the second diagnostic mode of the controller.

13. The HVAC system of claim 1, comprising a user interface communicatively coupled to the controller, wherein the controller is configured to receive additional signals from the user interface indicative of user settings for the controller, and wherein the controller is configured to operate the HVAC system based at least in part on the user settings.

14. The HVAC system of claim 1, wherein the additional operating parameter comprises a status indicator of the additional component, wherein the status indicator comprises an indication that the additional component comprises a healthy status or a fault status, wherein the healthy status is indicated by the additional current value within the additional expected value range, and wherein the fault status is indicated by the additional current value outside of the additional expected value range.

15. A method for automatically performing two or more diagnostic modes for a controller associated with a heating, ventilation, and air conditioning (HVAC) system, comprising:
   determining, via a processor of the controller, a first expected value range for a first operating parameter of a first component of the HVAC system, wherein the first component is associated with ductwork of the HVAC system, and wherein the first operating parameter is a pressure value associated with the ductwork;
   receiving, via a communication component of the controller, a first signal from a first sensor indicative of a first current value of the first operating parameter of the first component;
   determining, via the processor, that the first current value of the first operating parameter is outside the first expected value range;
   based on the determination that the first current value is outside the first expected value range, automatically initiating, via the processor, a first diagnostic mode of the two or more diagnostic modes of the controller;
   in the first diagnostic mode, collecting, via the communication component, diagnostic data associated with the HVAC system at a first frequency;
   determining, via the processor of the controller, a second expected value range for a second operating parameter of a second component of the HVAC system, wherein the second component is a heat exchanger of the HVAC system, and wherein the second operating parameter is a temperature of a working fluid through the heat exchanger;
   receiving, via the communication component of the controller, a second signal from a second sensor indicative of a second current value of the second operating parameter of the second component;
   determining, via the processor, that the second current value of the second operating parameter is outside the second expected value range;
   based on the determination that the second current value is outside the second expected value range, automatically initiating, via the processor, a second diagnostic mode of the two or more diagnostic modes of the controller; and
   in the second diagnostic mode, collecting, via the communication component, additional diagnostic data associated with the HVAC system at a second frequency, wherein the second diagnostic mode is different than the first diagnostic mode at least in that the second frequency is greater than the first frequency.

16. The method of claim 15, comprising:
   transmitting, via the communication component, the diagnostic data or the additional diagnostic data to a service center for determination of a proposed maintenance action; and
   receiving, via the communication component, the proposed maintenance action or a request to schedule the proposed maintenance action from the service center.

17. The method of claim 15, comprising collecting, via the communication component, the diagnostic data or the additional diagnostic data at a greater frequency, for a greater length of time, or a combination thereof compared to collecting operating parameter data while not in the first diagnostic mode or the second diagnostic mode.

18. The method of claim 15, comprising:
   determining, via the processor, that the first diagnostic mode or the second diagnostic mode has not been initiated during a predetermined time period; and
   based on the determination that the first diagnostic mode or the second diagnostic mode has not been initiated during the predetermined time period, automatically initiating, via the processor, the first diagnostic mode or the second diagnostic mode of the controller, wherein the predetermined time period comprises at least one season.

19. The method of claim 15, comprising:
   determining, via the processor, that the first diagnostic mode or the second diagnostic mode has not been initiated during a predetermined time period; and
   based on the determination that the first diagnostic mode or the second diagnostic mode has not been initiated during the predetermined time period, automatically initiating, via the processor, the first diagnostic mode or the second diagnostic mode of the controller, wherein the predetermined time period comprises an elapsed time period since a previous diagnostic mode.

20. A non-transitory computer-readable storage medium storing processor-executable instructions, wherein the instructions, when executed by a processor of a controller, cause the processor to:
- determine a plurality of expected value ranges for a plurality of operating parameters of a plurality of components of a heating, ventilation, and air conditioning (HVAC) system;
- receive, via a communication component of the controller, a plurality of signals from one or more sensors indicative of a plurality of current values of the plurality of operating parameters of the plurality of components at a first frequency;
- determine if one or more current values of the plurality of current values of the plurality of operating parameters is outside one or more expected value ranges of the plurality of expected value ranges;
- based on a first determination that only a single current value of the one or more current values is outside the one or more expected value ranges, automatically initiate a first diagnostic mode of the controller;
- based on a second determination that more than one current value of the one or more current values is outside the one or more expected value ranges, automatically initiate a second diagnostic mode of the controller;
- in the first diagnostic mode, collect, via the communication component, diagnostic data associated with the HVAC system at a second frequency; and
- in the second diagnostic mode, collect, via the communication component, additional diagnostic data associated with the HVAC system at a third frequency, wherein the second frequency and the third frequency are greater than the first frequency, and wherein the second diagnostic mode differs from the first diagnostic mode at least in that the third frequency is greater than the second frequency.

21. The non-transitory computer-readable storage medium of claim 20, wherein the instructions, when executed by the processor of the controller, cause the processor to automatically:
- transmit the diagnostic data or the additional diagnostic data to a service center for determination of a proposed maintenance action.

22. The non-transitory computer-readable storage medium of claim 21, wherein the instructions, when executed by the processor of the controller, cause the processor to automatically:
- receive the proposed maintenance action or a request to schedule the proposed maintenance action from the service center.

23. The non-transitory computer-readable storage medium of claim 20, wherein the plurality of expected value ranges is determined from baseline data transmitted from a service center.

24. The non-transitory computer-readable storage medium of claim 20, wherein the plurality of expected value ranges is determined by accessing a cloud database comprising the plurality of expected value ranges, wherein the plurality of expected value ranges is previously determined from baseline data determined during baseline tests.

* * * * *